US009726157B2

(12) United States Patent
Sweatman et al.

(10) Patent No.: US 9,726,157 B2
(45) Date of Patent: Aug. 8, 2017

(54) ENHANCED GEOTHERMAL SYSTEMS AND METHODS

(75) Inventors: Ronald E. Sweatman, Montgomery, TX (US); Jason L. Pitcher, The Woodlands, TX (US); Norm R. Warpinski, Cypress, TX (US); Mark S. Machala, Alvin, TX (US); Joel D. Shaw, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 338 days.

(21) Appl. No.: 13/882,600

(22) PCT Filed: May 9, 2012

(86) PCT No.: PCT/US2012/037074
§ 371 (c)(1),
(2), (4) Date: Feb. 12, 2015

(87) PCT Pub. No.: WO2013/169242
PCT Pub. Date: Nov. 14, 2013

(65) Prior Publication Data
US 2015/0300327 A1    Oct. 22, 2015

(51) Int. Cl.
*F03G 7/04* (2006.01)
*E21B 43/25* (2006.01)
(Continued)

(52) U.S. Cl.
CPC ............... *F03G 7/04* (2013.01); *E21B 43/25* (2013.01); *E21B 43/26* (2013.01); *F24J 3/085* (2013.01); *Y02E 10/14* (2013.01)

(58) Field of Classification Search
CPC .. F03G 7/04; E21B 43/25; E21B 43/26; F24J 3/085; Y02E 10/14
(Continued)

(56) References Cited

U.S. PATENT DOCUMENTS 4,265,310 A * 5/1981 Britton ................ E21B 43/2405
166/259
5,209,297 A  5/1993 Ott
(Continued)

FOREIGN PATENT DOCUMENTS

WO    2006027770 A2    3/2006
WO    2011049673 A2    4/2011

OTHER PUBLICATIONS

International Search Report and Written Opinion for PCT/US2012/059272 dated Jan. 2, 2013.
(Continued)

*Primary Examiner* — Hoang Nguyen
(74) *Attorney, Agent, or Firm* — McDermott Will & Emery LLP

(57) ABSTRACT

The present invention relates to systems and methods of intelligently extracting heat from geothermal reservoirs. One geothermal well system includes at least one injection well extending to a subterranean formation and configured to inject a working fluid into the subterranean formation to generate a heated working fluid. At least one production well extends to the subterranean formation and produces the heated working fluid from the subterranean formation. A production zone defines a plurality of production sub-zones within the subterranean formation and provides fluid communication between the at least one injection well and the at least one production well. Each production sub-zone is selectively accessed in order to extract heated working fluid therefrom and thereby provide a steady supply of heated working fluid to the surface.

33 Claims, 6 Drawing Sheets

(51) Int. Cl.
*E21B 43/26* (2006.01)
*F24J 3/08* (2006.01)

(58) Field of Classification Search
USPC ............ 60/641.2–641.4; 166/308.1, 50, 306
See application file for complete search history.

(56) References Cited

U.S. PATENT DOCUMENTS

| | | | |
|---|---|---|---|
| 5,675,488 A | 10/1997 | McElhinney | |
| 6,075,462 A | 6/2000 | Smith | |
| 6,176,315 B1 | 1/2001 | Reddy et al. | |
| 6,199,629 B1 | 3/2001 | Shirk et al. | |
| 6,657,597 B2 | 12/2003 | Rodney et al. | |
| 6,668,554 B1 | 12/2003 | Brown | |
| 6,750,783 B2 | 6/2004 | Rodney | |
| 7,063,145 B2* | 6/2006 | Veenstra | B09C 1/02 166/250.01 |
| 7,077,199 B2* | 7/2006 | Vinegar | E21B 43/243 166/245 |
| 7,084,782 B2 | 8/2006 | Davies et al. | |
| 7,104,319 B2* | 9/2006 | Vinegar | E21B 43/243 166/245 |
| 7,268,696 B2 | 9/2007 | Rodney et al. | |
| 7,416,022 B2* | 8/2008 | Maguire | E21B 43/247 166/245 |
| 7,753,122 B2 | 7/2010 | Curlett | |
| 7,784,545 B2 | 8/2010 | Maguire | |
| 8,020,382 B1 | 9/2011 | Zakiewicz | |
| 8,354,087 B2 | 1/2013 | Harless et al. | |
| 2004/0211568 A1 | 10/2004 | Funkhouser et al. | |
| 2005/0072567 A1 | 4/2005 | Steele et al. | |
| 2005/0072578 A1 | 4/2005 | Steele et al. | |
| 2005/0230113 A1 | 10/2005 | Eoff et al. | |
| 2006/0137349 A1 | 6/2006 | Pflanz | |
| 2007/0062697 A1 | 3/2007 | Barbosa et al. | |
| 2009/0147937 A1 | 6/2009 | Sullhan et al. | |
| 2010/0048430 A1 | 2/2010 | Funkhouser et al. | |
| 2010/0224408 A1 | 9/2010 | Kocis et al. | |
| 2010/0270003 A1 | 10/2010 | Sarria | |
| 2010/0300091 A1 | 12/2010 | Lewis | |
| 2010/0307756 A1 | 12/2010 | Jung et al. | |
| 2012/0013893 A1 | 1/2012 | Maida et al. | |
| 2012/0126993 A1 | 5/2012 | Samson et al. | |
| 2012/0145397 A1 | 6/2012 | Schultz et al. | |
| 2012/0145398 A1 | 6/2012 | Schultz et al. | |
| 2012/0145404 A1 | 6/2012 | Schultz et al. | |

OTHER PUBLICATIONS

Extended European Search Report for European Patent Application No. 12876571.6 dated Feb. 12, 2016.
International Search Report and Written Opinion for PCT/US2012/037074 dated Feb. 6, 2013.

* cited by examiner

ENHANCED GEOTHERMAL SYSTEMS AND METHODS

The present application claims priority to and is a National Stage entry of International Application No. PCT/US2012/037074 filed on May 9, 2012.

BACKGROUND

The present invention relates to geothermal energy production and, more particularly, to systems and methods of intelligently extracting heat from geothermal reservoirs.

Geothermal heat originating from the earth's core is a "renewable" source of energy. Briefly, the magma existing below the earth's crust heats nearby rocks and water, and hot geothermal effluent comprised of water and steam travels through faults and cracks to the earth's surface as geysers. Geysers in northern California are currently viable sources for geothermal energy plants. However, most hot geothermal water and heat stays deep underground trapped in geothermal reservoirs and must be brought to the surface via a drilled production well if it is to be productively used. A geothermal power plant is a thermal plant which uses the heat from geothermal reservoirs as its principal source for generation of electrical power. The geothermal effluent is heated in the geothermal reservoir and subsequently produced to the surface to power the geothermal power plant. The geothermal effluent most commonly used is water, which, in some applications, can phase transition into steam during the heat extraction process from the geothermal reservoir.

There are basically three kinds of geothermal power plants which utilize this hot water/steam in geothermal reservoirs as a geothermal effluent. A "dry" steam reservoir produces steam, but very little water. This steam is piped directly to a "dry" steam power plant to provide the force to spin a turbine generator. A second kind of plant, called a "flash" power plant, taps into a geothermal reservoir that produces mostly hot water ranging in temperatures between 200° F. and 300° F. This high temperature water is brought to the surface and, once released from the pressure of the reservoir, flashes into steam in a separator. The steam is then used to drive an adjacent turbine. In a third kind of plant, called a "binary" power plant, geothermal effluent between 250-360° F. is passed through a heat exchanger where its heat is transferred to a second (binary) liquid that boils at a lower temperature than the effluent. When heated, the binary liquid flashes to vapor which expands and spins turbine blades.

To more efficiently extract heat from geothermal reservoirs, the reservoirs are often fractured in order to provide enhanced fluid communication through the resulting fracture networks. The permeability of the resulting fracture network directly affects the heat transfer capability of the geothermal effluent as it circulates therethrough. What is needed is an intelligent means of extracting heat from fracture networks defined in geothermal reservoirs, and thereby provide a steady source of heat to a power plant arranged at the surface.

SUMMARY OF THE INVENTION

The present invention relates to geothermal energy production and, more particularly, to systems and methods of intelligently extracting heat from geothermal reservoirs.

In one embodiment, a geothermal well system is disclosed. The system may include at least one injection well extending from a surface to a subterranean formation, the at least one injection well being configured to inject a working fluid into a production zone defined within the subterranean formation and thereby generate a heated working fluid, wherein the production zone is fractured to enhance fluid conductivity; at least one production well extending from the surface to the subterranean formation, the at least one production well being configured to produce the heated working fluid from the production zone to the surface; and a plurality of production sub-zones defined within the production zone and providing fluid communication between the at least one injection well and the at least one production well, wherein each production sub-zone is selectively accessed in order to extract heated working fluid therefrom and thereby provide a corresponding supply of heated working fluid to the surface.

In some embodiments, a method of extracting thermal energy from a subterranean formation is disclosed. The method may include injecting a working fluid from at least one injection well into a production zone defined in a subterranean formation, the at least one injection well extending from a surface and the production zone being fractured to enhance fluid conductivity; circulating the working fluid within the production zone in order to generate a heated working fluid; selectively accessing portions of the production zone via at least one production well extending from the surface and thereby defining a plurality of production sub-zones in the production zone; and producing the heated working fluid from the plurality of production sub-zones to the surface via the at least one production well and thereby providing a corresponding supply of heated working fluid to the surface.

In yet other embodiments, another geothermal well system is disclosed. The system may include at least one injection well extending from a surface and through a subterranean formation, the at least one injection well being configured to inject a fluid into a production zone defined within the subterranean formation and thereby generate a heated working fluid, the production zone being fractured to enhance fluid conductivity; at least one production well extending from the surface and to the subterranean formation, the at least one production well being configured to produce the heated working fluid from the production zone to the surface; one or more lateral production wells extending from the at least one production well and into the production zone; and one or more production flow control devices arranged in each lateral production well and being selectively actuatable to provide access to the production zone and thereby define a plurality of production sub-zones within the production zone, the plurality of production sub-zones being configured to provide fluid communication between the at least one injection well and the at least one production well and thereby provide a corresponding supply of heated working fluid to the surface.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present invention relates to geothermal energy production and, more particularly, to systems and methods of intelligently extracting heat from geothermal reservoirs.

Intelligently extracting thermal energy from geothermal reservoirs may prove advantageous in providing a power plant with a steady, uninterrupted flow of heated working fluid. Consequently, the power plant may be able to continuously generate electricity, unhampered by inefficient, low temperature working fluid. Intelligent heat extraction may also allow geothermal energy to be extracted from shallower reservoirs that exhibit lower temperatures thought not to have sufficient thermal energy. As a result, lower capital expenditures and operating expenditures are possible. The systems and methods described herein can be used in newly formed wellbores, but may equally be used in existing wellbores that exhibit a bottom hole temperature sufficient to provide heated working fluid to the surface. For example, the systems and methods described herein can be used in inactive hydrocarbon wellbores, such as spent shale oil/gas reservoirs.

Figure 1:
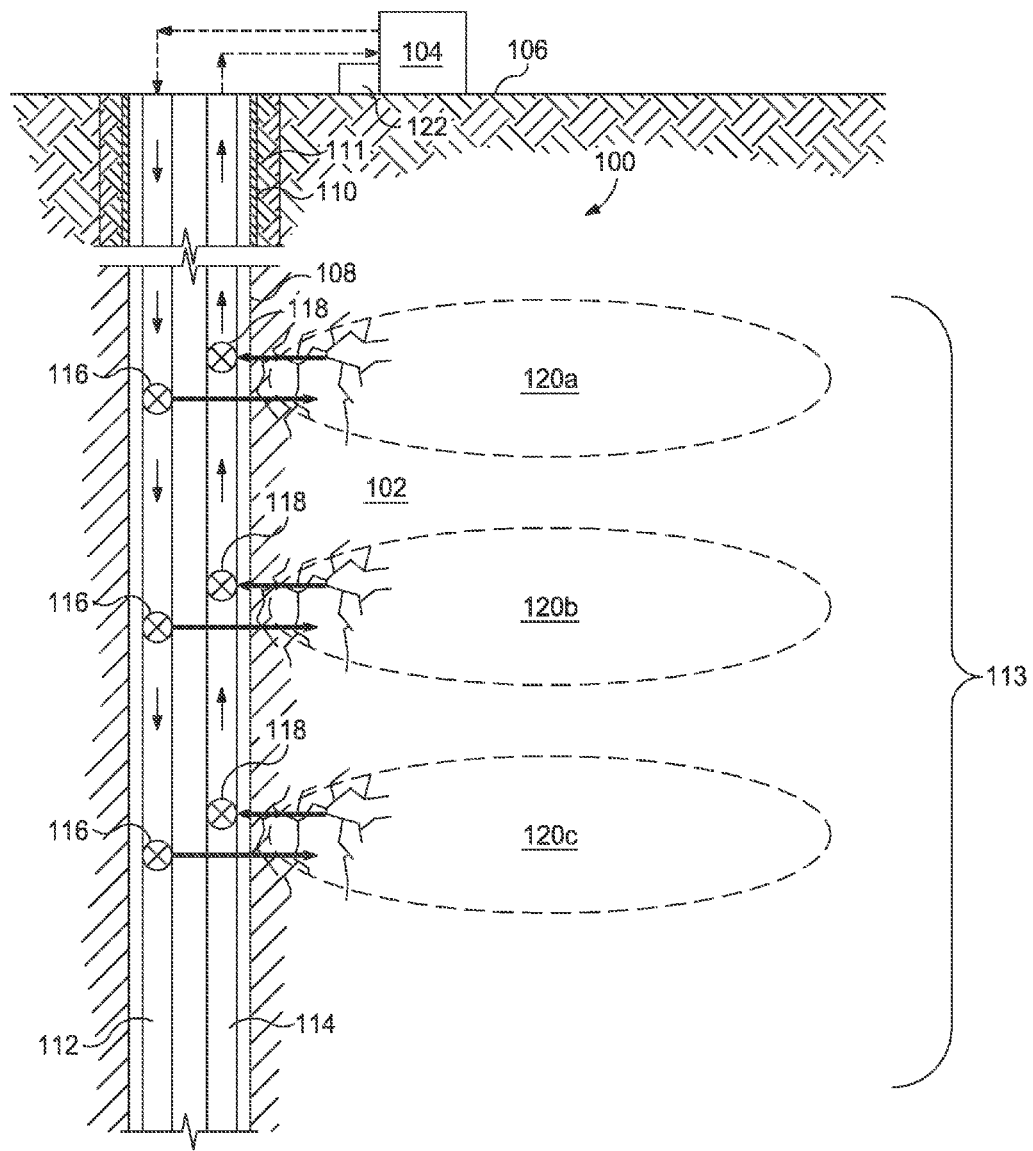
FIG. 1 illustrates an exemplary geothermal well system, according to one or more embodiments.

Referring to FIG. 1, illustrated is an exemplary geothermal well system 100 used to extract heat from a subterranean formation 102, according to one or more embodiments. A power plant 104 may be arranged at the surface 106 and configured to circulate a working fluid into the subterranean formation 102 and produce a heated working fluid back to the surface 106. The heated working fluid may subsequently be used as a source of thermal energy that the power plant 104 may exploit in the generation of electricity. Accordingly, the power plant 104 may be equipped with suitable heat exchangers, turbines, pumps, and/or condensers used to receive the heated working fluid, extract the thermal energy therefrom, and prepare the reconditioned working fluid for reintroduction into the subterranean formation 102.

It should be noted that, although FIG. 1 depicts the geothermal well system 100 as being arranged in a generally vertical configuration, those skilled in the art will readily recognize that the system 100 is equally well suited for use in wells having other directional configurations including horizontal wells, deviated wellbores, slanted wells, multilateral wells, combinations thereof, and the like. Accordingly, the use of directional terms such as above, below, upper, lower, upward, downward, left, right, uphole, downhole and the like are used herein in relation to the illustrative embodiments as they are depicted in the figures; the upward direction being toward the top of the corresponding figure and the downward direction being toward the bottom of the corresponding figure; the uphole direction being toward the surface 106 of the well and the downhole direction being toward the toe of the well.

As illustrated, the well system 100 may include a wellbore 108 that extends through various earth strata and into the subterranean formation 102. The wellbore 108 may have a casing string 110 cemented in at least a portion thereof. While the casing string 110 is shown as extending only partially down the wellbore 108, in other embodiments, the casing string 110 may extend the entire length of the wellbore 108. The cement 111 used to secure and seal the casing string 110 may be a geothermal cement configured to provide an insulative barrier between the wellbore 108 and the surrounding subterranean formation 102 such that heat transfer between the two is minimized or otherwise prevented entirely. Suitable cements 111 that may be used for this purpose include, but are not limited to, foamed cement, microsphere cement, combinations thereof, and the like.

Moreover, the cement 111 may be configured or otherwise designed to resist pressure loads without cracking by employing special additives that serve to decrease the Young's Modulus of the hard-set cement. The additive(s) will allow the cement 111 to bend or deform with the applied loads, which in some cases may be cyclic, without damaging the integrity of the cement 111, and thereby allowing the cement 111 to deform and reform its shape without cracking. Examples of additives configured to impart ductility to the cement 111 include, but are not limited to, nitrogen foam, elastomeric particles and fibers, combinations thereof, and the like. When geothermal temperatures are extremely high, Portland cements may not be durable enough for the life of the well. In such cases, non-Portland cements, such as Halliburton's THERMALOCK™ cement or the like, may be utilized. THERMALOCK™ is a calcium phosphate cement that can be used in temperatures up to 700° F. Those skilled in the art will readily recognize that calcium phosphate cements can be foamed or use microspheres to formulate lightweight cement slurries to prevent lost circulation in geothermal wells.

In one or more embodiments, the subterranean formation 102 may be a geothermal reservoir consisting of any rocks that have the geothermal temperatures needed to run geothermal power plants. For example, said rock formations may be shales, mudstones, sandstones, carbonates (dolomites, limestones, etc.), and rocks with volcanic origins such as basalts and other igneous rocks, and metamorphic rocks. In some embodiments, the formation 102 may be a former hydrocarbon-bearing formation, such as a depleted shale oil/gas reservoir or other inactive hydrocarbon reservoirs.

As illustrated, the subterranean formation 102 may include a production zone 113 into which the working fluid may be injected and from which the heated working fluid may be derived. In order to increase fluid conductivity of the working fluid within the production zone 113, and thereby increase heat transfer capabilities, the production zone 113 may be hydraulically fractured in one or more locations, thereby resulting in one or more fracture networks defined within the formation 102. The fracture networks may allow the working fluid to circulate within the production zone 113 while simultaneously increasing in temperature. The fracture networks may be created by any suitable hydraulic fracturing treatment/method including, but not limited to, acidization methods, hydraulic fracturing with non-traditional fluids, shear dilation fracturing (i.e., hydroshearing), slickwater fracturing, gelled fluid fracturing, foam fracturing, gas fracturing, energized or emulsion fracturing, combinations thereof, and the like. Those skilled in the art will readily recognize that such fracturing treatments/methods may be undertaken in hybrid or staged approaches to facilitate the development of widespread fracture networks that allow for the slow percolation of fluids therethrough and which provide sufficient well injectivity and productivity to ensure advantageous economic rates of heat extraction.

In some embodiments, the fracturing techniques may or may not use propping agents. At least some advantages to using proppant while fracking the production zone 113 include potentially increasing the injectivity and productivity rates, and otherwise helping to maintain the fractures open during production. Suitable proppants include those that are designed or otherwise capable of withstanding temperature, pressure, dissolution, and cyclic fatigue. In some applications, the proppant would depend on the characteristics of the production zone 113, such as a proppant that avoids clay swelling/cleavage and fines dislodgement. In one or more embodiments, a proppant surface modifying agent may also be used to prevent proppant crushing, fines migration, and/or digenesis. Suitable services that apply proppant surface modifying agents include, but are not limited to, Halliburton's SANDWEDGE® and EXPEDITE® conductivity enhancement services. It will be appreciated by those skilled in the art, however, that the use of other precured or curable resin coated proppants could also be used for these purposes, without departing from the scope of the disclosure.

In some embodiments, the fracture networks generated may include multiple smaller fracture networks that similarly operate to allow fluid communication of the working fluid. Exemplary methods of fracturing subterranean formations in order to enhance geothermal heat extraction are described in U.S. Pat. No. 7,784,545 entitled "In-Situ Method of Fracturing Gas Shale and Geothermal Areas," the contents of which are hereby incorporated by reference to the extent not inconsistent with the present disclosure.

The formation 102 may exhibit a temperature suitable for geothermal heat extraction across a wide range of applications. For example, in one or more embodiments, the temperature of the formation 102 may range anywhere from about 200° F. to about 750° F. In other embodiments, however, the formation 102 may exhibit a temperature of less than 200° F. and/or greater than 750° F., without departing from the scope of the disclosure. It should be noted that any temperature ranges disclosed herein are merely by way of example, and in no way should be considered as limiting to the scope of the disclosure. Moreover, those skilled in the art will appreciate that the type of energy generation process employed by the geothermal power plant 104 will largely dictate the required temperatures and which rock formations can efficiently be used to obtain such temperatures. For example, some Rankine cycle processes utilized for power generation are able to run on temperatures as low 265° F. However, taking into account generalized heat losses derived from the transit of the heated working fluid to the surface 106 may require that the subterranean formation 102 exhibit a temperature much greater than 265° F.

The well system 100 may further include an injection string 112 and a production string 114 extending from the surface 106 and generally arranged within the wellbore 108. In some embodiments, the injection and production strings 112, 114 may be laterally-offset from one another within the wellbore 108, as illustrated. In such embodiments, an insulative barrier (not shown) may be arranged between the injection and production strings 112, 114 in order to minimize heat transfer between the two components of the system 100. However, in other embodiments, the injection and production strings 112, 114 may be configured in a nested or concentric relationship such that a solitary tubular structure extends from the surface 106. In such an embodiment, the injection and production strings 112, 114 may be concentrically separated a short distance by an insulative barrier that minimizes heat transfer between the injection and production strings 112, 114.

Both the injection and production strings 112, 114 may be communicably coupled to the power plant 104 and may be used to circulate the working fluid through the subterranean formation 102 and back to the power plant 104 in the form of heated working fluid. Specifically, the injection string 112 may be configured to inject or otherwise provide the working fluid into the subterranean formation 102 so that the working fluid may circulate therein and increase in temperature. In some embodiments, the injection string 112 may also be used to hydraulically fracture the subterranean formation 102, if needed. The production string 114 may be configured to extract heated working fluid from the subterranean formation 102 and produce the heated working fluid to the power plant 104 located at the surface 106.

The working fluid may be any substance capable of flowing. For example, the working fluid may include liquids, gelled liquids, gases, slurries, emulsions, combinations thereof, and the like. In some embodiments, the working fluid can be an aqueous fluid such as water, a treatment fluid, a formation fluid, or the like. In other embodiments, the working fluid can include organic compounds such as hydrocarbons, oil, a refined component of oil, petrochemical products, and the like. The working fluid can also include various flowable mixtures of solids, liquid, and/or gases. For example, certain types of nano-sized particles mixed in fluids can significantly increase a thermal conductivity of a fluid (e.g., water, glycol, etc.). As will be appreciated, the greater the thermal conductivity of a working fluid, the more efficient the heat carrying capacity of the fluid will be. Some suitable gases that may be used as the working fluid include, but are not limited to, air, nitrogen, carbon dioxide, argon, helium, hydrogen disulfide, mercaptan, thiophene, methane, ethane, butane, and other hydrocarbon gases, and/or the like.

One of the more common working fluids used in geothermal operations is water, due to the fact that water exhibits one of the highest thermal conductivities as compared with other geothermal effluents. Table 1 below, however, provides a non-exhaustive listing of other working fluids that also exhibit high thermal conductivities.

TABLE 1

| Fluid | Thermal Conductivity (W/mK) |
|---|---|
| Water | 0.6 |
| Other polar liquids | 0.2-0.6 |
| Fluorinerts | 0.06-0.07 |
| Low viscosity oils | 0.11-0.15 |
| Other organic liquids | 0.12-0.20 |
| Molten salts | 1.0-4.0 |
| Molten metals | 10.0-100.0 |

As illustrated in Table 1, some fluids, such as molten salts and metals, exhibit higher thermal conductivities than water. However, most molten salts and metals are flowable only at high temperatures that are not suitable for geothermal working fluids that have to travel through fractures inside rocks without damaging the rocks. At least one exception may be flowable eutectic mixtures (metals, salts, etc.) that exhibit low melting points so that the rocks are not exposed to damaging high temperatures. For example, sodium chloride and water form a eutectic mixture that works as a heat carrying fluid unless exposed to −21.2° C. wherein the salt begins to solidify.

As illustrated, the injection string 112 may include one or more injection flow control devices 116 operable to inject the working fluid into the subterranean formation 102 at predetermined locations. In some embodiments, however, the injection flow control devices 116 may be omitted or otherwise simply characterized as working fluid injection points defined along the length of the injection string 112. Likewise, the production string 114 may include one or more production flow control devices 118 used to extract the heated working fluid from the subterranean formation 102. In embodiments where the casing string 110 extends the entire length of the wellbore 108, the casing string 110 may have one or more perforations (not shown) defined therein to facilitate fluid communication of the working fluid into and out of the subterranean formation 102 via the injection and production flow control devices 116, 118. In other embodiments, the downhole portion of the wellbore 108 may include a perforated liner that also allows fluid communication of the working fluid into and out of the subterranean formation 102 via the injection and production flow control devices 116, 118.

The flow control devices 116, 118 may be any type of fluid regulating device. For example, in one embodiment, one or more of the flow control devices 116, 118 may be a device configured to selectively allow flow of the working fluid therethrough. In other embodiments, however, one or more of the flow control devices 116, 118 may be a valve, a restrictor, a sliding sleeve, or a diverter similarly configured to selectively allow flow of the working fluid therethrough. In yet other embodiments, one or more of the flow control devices 116, 118 may be a thermally-controlled or pressure-controlled flow control device configured to autonomously open or shut upon being exposed to a predetermined temperature or pressure. In some embodiments, as will be described in further detail below, one or more of the flow control devices 116, 118 may be configured to throttle the working fluid as it passes therethrough.

In yet other embodiments, suitable flow control devices 116, 118 may include those described in co-owned U.S. patent application Ser. No. 12/967,126 entitled "Geothermal Energy Production," U.S. patent application Ser. No. 12/967,133 entitled "Controlling Flow Between a Wellbore and an Earth Formation," and U.S. patent application Ser. No. 12/967,119 entitled "Controlling Flow of Steam Into and/or Out of a Wellbore," the contents of each are hereby incorporated by reference to the extent not inconsistent with the present disclosure. The various flow control devices discussed in the above-identified references automatically restrict or otherwise control flow in response to a change of the phase of the flowing fluid, for example from steam to liquid water. As will be appreciated, however, any other suitable flow control devices or valves may be employed, without departing from the scope of the disclosure. For example, some suitable flow control devices that may be used include Halliburton's SSTEAM™ and SFRAC™ valves.

One or more production sub-zones 120 may be defined in the production zone 113 of the subterranean formation 102; depicted in FIG. 1 as a first production sub-zone 120a, a second production sub-zone 120b, and a third production sub-zone 120c. While only three production sub-zones 120a-c are illustrated in FIG. 1, it will be appreciated that more than three production sub-zones 120a-c may be provided, without departing from the scope of the disclosure. In some embodiments, each production sub-zone 120a-c may correspond to one or more adjacent injection and production flow control devices 116, 118 such that the particular production sub-zone 120a-c is able to receive working fluid from the injection string 112 and discharge heated working fluid to the production string 114 via corresponding injection and production flow control devices 116, 118, respectively.

While depicted as being offset from each other in FIG. 1, one or more of the production sub-zones 120a-c, or at least the fracture networks defined therein, may overlap or at least extend into close proximity with an adjacent production sub-zone 120a-c and the fracture networks defined therein, without departing from the scope of the disclosure. Moreover, while the production sub-zones 120a-c are depicted as being vertically offset from each other within a single plane of the production zone 113, it is also contemplated that the production sub-zones 120a-c may be angularly offset from each other about the circumference of the wellbore 108, without departing from the scope of the disclosure.

In some embodiments, one or more of the production flow control devices 118 may be selectively opened and/or closed in order to regulate the production of heated working fluid from the corresponding production sub-zones 120a-c. In one or more embodiments, selective actuation of the production flow control devices 118 may be based upon a particular property or combination of properties of the working fluid. For example, properties of the working fluid which may dictate whether the production flow control devices 118 may actuate may include, but are not limited to, the temperature of the working fluid, the phase of the working fluid, the flow rate of the working fluid through the particular flow control device 118, the fluid pressure of the working fluid, combinations thereof, or the like.

In one exemplary embodiment, selective actuation of the production flow control devices 118 may be based upon the temperature of the heated working fluid as extracted from the corresponding production sub-zone 120a-c. For example, each production flow control device 118 may be configured to sense and measure the temperature of the extracted heated working fluid and report the same to a surface computation device 122 that may be integrated with the power plant 104. For example, in some embodiments, the production flow control devices 118 may include one or more sensors (not shown) that are communicably coupled to the computation device 122 via a fiber optic link, copper wire, or other wired communication medium. Suitable sensing systems and sensors that may be employed in one or more embodiments include, but are not limited to, distributed temperature sensing (DTS) systems, distributed pressure sensing (DPS) systems, electrical or fiber point temperature or pressure sensors, fiber optic sensors for pressure, stress, acoustics, and/or chemistry, combinations thereof, and the like. Exemplary DTS and/or DPS systems may be installed downhole using simple fiber optics and may provide real-time data (e.g., temperature and pressure) from the subterranean formation 102.

In other embodiments, however, the production flow control devices 118 (and/or related sensors) may communicate with the computation device 122 wirelessly via, for example, radio waves, acoustic telemetry, electromagnetic telemetry, gravity waves, pressure pulse, combinations thereof, or the like. In yet other embodiments, the production flow control devices 118 (and/or related sensors) may communicate with the computation device 122 using short hop wireless telemetry and/or cross-pipe electromagnetic telemetry as generally discussed in co-owned U.S. patent application Ser. Nos. 12/288,726 and 12/838,736, and U.S. patent application Ser. No. 13/387,843, respectively, the contents of which are hereby incorporated by reference to the extent not inconsistent with the present disclosure. Exemplary sensors and gauges that may be used to measure downhole temperature and pressure include Halliburton's ROC™ line of permanent downhole gauges and Halliburton's EZ GAUGE® permanent pressure monitoring system.

The computation device 122 may be a computer that includes a processor configured to execute one or more sequences of instructions or code stored on a non-transitory, computer-readable medium. The processor can be, for example, a general purpose microprocessor, a microcontroller, a digital signal processor, an artificial neural network, or any like suitable entity that can perform calculations or other manipulations of data. In some embodiments, the computation device 122 may further include a memory or any other suitable storage device or medium. In some embodiments, the computation device 122 and corresponding injection and production flow control devices 116, 118 and other components may form part of a remote control, intelligent downhole injection and production system, such as the SMARTWELL® systems and technology available through Halliburton Energy Services of Houston, Tex. Those skilled in the art, however, will readily recognize that any remote control, intelligent downhole injection and production system may be employed, without departing from the scope of the disclosure.

The computation device 122 may be configured to receive the temperature measurements obtained at each of the production flow control devices 118 in near real-time and determine when the temperature of the heated working fluid at a particular production flow control device 118 falls below a predetermined low temperature. As used herein, the predetermined low temperature may refer to a low temperature threshold limit where, if the temperature of the heated working fluid falls therebelow, power generation efficiencies obtained from the power plant 104 at the surface 106 will decline past an acceptable limit. In some embodiments, the predetermined low temperature may be about 260° F., which may be suitable for power generation in one or more geothermal power plants 104. In other embodiments, the predetermined low temperature may be more or less than 260° F., depending on several factors.

For example, the lowest temperature commercial geothermal power plant operating in the U.S. in the year 2000 used a resource temperature of about 220° F. A 100-kW plant using a 200° F. resource (geothermal working fluid) might require as much as 300 gpm flow rate to run the geothermal power plant, which would consequently require more wells to supply the required flow rate. Those skilled in the art will readily recognize that the resource temperature is mainly dependent on the cost of electric power that it is able to generate. Consequently, the predetermined low temperature may be directly dependent on the type of geothermal power plant selected of the project and the lowest possible operating cost of electricity versus the depreciation of the large capital cost of the geothermal project. In other embodiments, the predetermined low temperature may vary depending on geography and the potential temperature differential between the heated working fluid reaching the surface 106 and the ambient air at the surface 106.

Accordingly, the computation device 122 may be programmed to recognize temperatures at or below the predetermined low temperature for each of the production flow control devices 118 and autonomously act in response thereto. Specifically, once the computation device 122 recognizes a temperature at or below the predetermined low temperature at a particular production flow control device 118, the computation device 122 may be configured to autonomously trigger the closure or throttling of the particular production flow control device 118, such that production of the low temperature working fluid at that production flow control device 118 ceases or at least slows. In some embodiments, the production flow control devices 118 may be electro-mechanically actuated using one or more downhole actuators or servos triggered by a signal sent by the computation device 122. In other embodiments, however, the production flow control devices 118 may be hydraulically actuated once triggered by the computation device 122. In yet other embodiments, the production flow control devices 118 may be controlled with a combination of both downhole electric and hydraulic control. In embodiments where the production flow control device 118 is a thermally-controlled flow control device, however, the computation device 122 may not be needed, and instead the production flow control device 118 may be configured to autonomously open or shut upon being exposed to the predetermined temperature ranges. In yet other embodiments, the production flow control device 118 may be opened and/or closed with intervention via wireline, slickline, coiled tubing, jointed pipe or dropping balls.

In some embodiments, the computation device 122 may be configured to communicate an alert signal, either wired or wirelessly, to a user at the surface 106. The alert signal may warn the user that a temperature at or below the predetermined low temperature has been registered at one of the production flow control devices 118, and prompt the user to manually manipulate the corresponding production flow control device 118 via remote control or the like. In yet other embodiments, the computation device 122 may be configured to communicate the alert signal to a remote location (either wired or wirelessly) and similarly warn a user that a temperature at or below the predetermined low temperature has been registered at one of the production flow control devices 118. Upon being alerted of the low temperature status, the user in the remote location may then send a return signal back to the computation device 122 (again, either wired or wirelessly) and instruct the computation device 122 to manually manipulate the corresponding production flow control device 118.

In operation, through the intelligent control of the production flow control devices 118, the geothermal well system 100 may be configured to provide the power plant 104 with a continuous and steady supply of acceptable (i.e., within an acceptable temperature range) heated working fluid. For example, when the temperature of the heated working fluid extracted from the first production sub-zone 120a reaches or falls below the predetermined low temperature limit, the corresponding production flow control device 118 may be configured to close, either autonomously or through the subsequent actions taken by the computation device 122 or the user. Production of acceptable heated working fluid, however, may continue to the power plant 104 as extracted from the second and/or third production sub-zones 120b,c via their corresponding production flow control devices 118. Once production from the first production zone 120a ceases, this may provide time for the first production zone 120a to thermally recuperate until its temperature ascends once again above the predetermined low temperature limit and to, for example, a predetermined production temperature limit. Once the temperature of the first production zone 120a ascends above the predetermined low temperature limit, or otherwise to the predetermined production temperature limit, the corresponding production flow control device 118 may be re-opened, either autonomously or through subsequent actions taken by the computation device 122, the user, chemical intervention, etc., in order to re-commence production of the heated working fluid from the first production zone 120*a*.

The predetermined production temperature limit may either be autonomously recognized by the production flow control device 118 or otherwise programmed into the computation device 122 such that the production flow control device 118 is automatically actuated to open upon reaching the predetermined production temperature limit. In some embodiments, the predetermined production temperature limit may be much greater than the predetermined low temperature limit. For example, and in no way limiting the disclosure, if the predetermined low temperature limit were 260° F., the predetermined production temperature limit may be designed at about 300° F. Accordingly, the production flow control device 118 may be configured to remain closed until the corresponding production sub-zone 120*a-c* thermally recuperates and exhibits a temperature of about 300° F., thereby providing a source of suitable thermal energy within the particular production sub-zone 120*a-c* which can be produced for a significant duration of time.

As can be appreciated, various embodiments of intelligently controlling the production flow control devices 118 may be used to ensure that a continuous and steady supply of heated working fluid is provided to the power plant 104 from the production zone 113. For example, the production flow control devices 118 may be configured to sequentially or strategically alternate such that production of the heated working fluid alternates between the various production sub-zones 120*a-c*, thereby ensuring that the temperature of the working fluid in each production sub-zone 120*a-c* remains above the predetermined low temperature limit. In other embodiments, one production sub-zone 120*a-c* may produce heated working fluid until the temperature therein declines to the predetermined low temperature, at which point one or more of the other production sub-zones 120*a-c* may be opened to continue production of the heated working fluid while the former production sub-zone 120*a-c* thermally recovers.

In some cases, the total number of production sub-zones 120*a-c* or production zones 113 or wells may be enough to establish an excess number (i.e., an over-capacity) of them so that when each production subzone 120*a-c* is flowing together, a subsurface flow rate capacity is provided that exceeds the minimum flow rate required by the geothermal power plant 104 at the surface 106. As will be appreciated, the higher flow capacity will allow for the flows from the "excess" production sub-zones 120*a-c*, production zones 113, or wells to be completely suspended or otherwise reduced, thereby allowing time for geothermal heating from surrounding rocks to replenish a corresponding minimum stored heat capacity. Once the heat capacities are restored to predetermined levels, they can be ready for re-opening or throttling up flows when needed. In one or more embodiments, the excess number of production sub-zones 120*a-c*, production zones 113, and/or wells can be determined by thermal simulations using computer software or by actual temperature measurements of the cooling and heating cycle times for each one. Moreover, the "excess" production sub-zones 120*a-c*, production zones 113, and/or wells may be installed when the wells are drilled or later by adding more wells or extending the length of existing wells or laterals. Similar increases of overall subsurface heat capture capacities can be constructed when power generating capacity of the power plant 104 is subsequently expanded, such as when additional turbine generators and/or associated electric power generating equipment are installed.

In some embodiments, similar to the production flow control devices 118, the injection flow control devices 116 may also be communicably coupled to the computation device 122. Accordingly, injection of the working fluid via the injection flow control devices 116 may also be intelligently controlled, thereby ensuring that an appropriate amount of working fluid circulates through the production sub-zones 120*a-c* such that a continuous and steady supply of heated working fluid is provided to the power plant 104 from the production zone 113. Selectively actuating the injection flow control devices 116 may serve to regulate production of heated working fluid from the corresponding production sub-zones 120*a-c*. For example, closing the injection flow control device 116 corresponding to the first production zone 120*a* may result in the cessation of heated working fluid production via the corresponding production flow control device 118. In other embodiments, selectively regulating or otherwise throttling the flow of the working fluid through the injection flow control devices 116 may serve to provide an appropriate amount of working fluid to the corresponding production sub-zones 120*a-c* such that the working fluid is adequately heated before being produced to the surface 106.

In at least one embodiment, the computation device 122 may be configured to initiate the release of a diverting or coalescing agent into the geothermal well system 100 in order to plug or substantially occlude one or more of the injection flow control devices 116 that register the predetermined low temperature. In some embodiments, the diverting agent may include, but is not limited to, polylactic acid, benzoic acid flakes, or other water-hydrolysable chemicals or materials. In other embodiments, the diverting or coalescing agent may be an epoxy or the like that serves to generally plug the injection flow control device 116 registering the low temperature. In some embodiments, the diverting agent may be configured to eventually degrade over time, thereby effectively reopening the particular injection flow control device 116 after a predetermined amount of time has passed. In other embodiments, however, the diverting agent may be configured to degrade upon coming into contact with a degrading chemical injected into the well system 100, and thereby likewise reopening the particular injection flow control device 116. In yet other embodiments, the diverting agent may be configured to degrade once the temperature of the corresponding production sub-zone 120*a-c* ascends once again above the predetermined low temperature.

In at least one aspect of the disclosure, the flow of the working fluid in the geothermal well system 100 may be reversed. For example, in at least one embodiment, the production string 114 may be used to inject the working fluid into the production zone 113, and the injection string 112 may be configured to draw heated working fluid from the production zone 113. It will be appreciated by those skilled in the art that reversing the working fluid circulation may serve to remove or otherwise counteract the build-up of scale or solid particles in the system 100, which could develop over time and impede production to the surface 106. For example, reversing the flow may allow for the injection of scale-reducing chemicals or acids which would then actively work to remove the scale or solid particles that restrict the working fluid flow.

In one or more embodiments, the injection string 112 and the production string 114 may be combined as a unitary injection/production string that extends from the surface 106 within the wellbore 108. In such an embodiment, the injection and/or production flow control devices 116, 118 may each be configured to both inject and produce working fluid to/from the corresponding production sub-zones 120a-c, depending on whether production or injection operations are being conducted. In one embodiment, for example, the flow control device(s) 116, 118 corresponding to the first production sub-zone 120a may be configured to inject working fluid into the first production sub-zone 120a and thereafter close in order to generate heated working fluid therein. While the working fluid in the first production sub-zone 120a is increasing in temperature, the flow control device(s) 116, 118 corresponding to one or both of the second and third production sub-zones 120b,c may be configured to open such that heated working fluid may be produced therefrom to the surface 106.

Eventually, production of heated working fluid from the second and/or third production sub-zones 120b,c may cease, either for insufficient thermal energy or working fluid. At this point, the corresponding flow control devices 116, 118 may then be changed from producing flow control devices to injecting flow control devices as additional working fluid may be injected into the second and/or third production sub-zones 120b,c and thereafter closed in order to generate additional heated working fluid therein. While the working fluid in the second and third production sub-zones 120b,c is increasing in temperature, the flow control device(s) 116, 118 corresponding to the first production sub-zone 120a may be re-opened and the heated working fluid now present therein may then be produced to the surface 106. Accordingly, the flow control devices 116, 118 may be intelligently controlled along the entire length of the unitary injection/production string such that the thermal energy found in each production sub-zones 120a-c may be strategically or sequentially harvested for use in the power plant 104.

Figure 2:
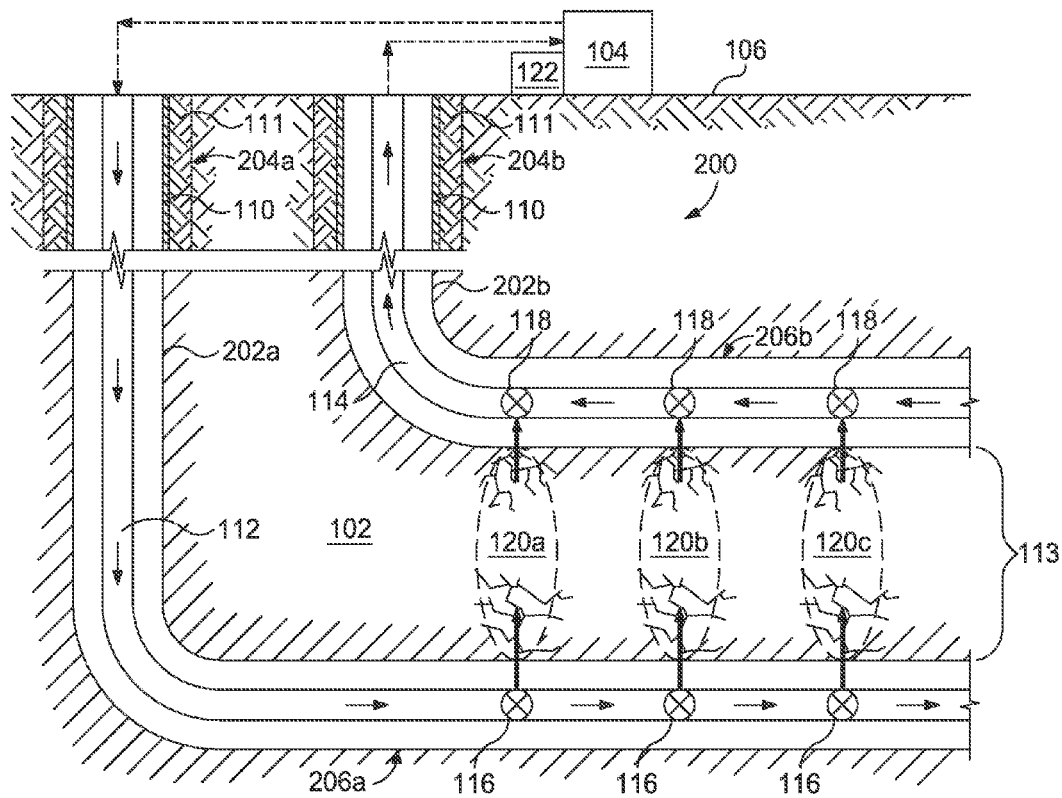
FIG. 2 illustrates another exemplary geothermal well system, according to one or more embodiments.

Referring now to FIG. 2, illustrated is another exemplary geothermal well system 200 used to extract heat from the subterranean formation 102, according to one or more embodiments. The geothermal well system 200 may be best understood with reference to FIG. 1, where like numerals represent like components that will not be described again in detail. As illustrated, the well system 200 may include an injection well 202a and a production well 202b each extending from the surface 106 through various earth strata and into the subterranean formation 102. At least a portion of the upper or vertical sections 204a and 204b of each of the injection and production wells 202a,b, respectively, may include the casing string 110 cemented therein, and the lower or horizontal sections 206a and 206b of each well 202a,b, respectively, may extend generally horizontally through the subterranean formation 102. While the casing string 110 is shown as extending along only a portion of each well 202a,b, in other embodiments the casing string 110 may extend along the entire length of each well 202a,b, without departing from the scope of the disclosure. Such an embodiment may prove advantageous in having the cement 111 provide an insulative barrier along the entire length of each well 202a,b.

The injection string 112 may be generally arranged within the injection well 202a and the production string 114 may be generally arranged within the production well 202b, each string 112, 114 being in fluid communication with the power plant 104 at the surface 106. In one or more embodiments, the respective downhole ends of the injection and production strings 112, 114 may be perforated or otherwise include a perforated liner (not shown) that facilitates fluid communication into and/or out of each string 112, 114.

As illustrated, the horizontal sections 206a,b of each well 202a,b, may be vertically offset from each other within the production zone 113. In other embodiments, however, the horizontal sections 206a,b of each well 202a,b may be horizontally or laterally offset from each other within the production zone 113, without departing from the scope of the disclosure. In yet other embodiments, the horizontal sections 206a,b of each well 202a,b may be both vertically and horizontally offset from each other within the production zone 113. Moreover, in at least some embodiments, more than one injection well 202a and/or more than one production well 202b may be included in the system 200, as will be discussed in greater detail below.

A plurality of production sub-zones 120a-c may again be defined in the production zone 113 of the subterranean formation 102. Again, while only three production sub-zones 120a-c are illustrated, it will be appreciated that more than three may be defined, without departing from the scope of the disclosure. Moreover, while shown as being offset from each other in FIG. 2, one or more of the production sub-zones 120a-c may overlap or at least extend into close proximity with an adjacent production sub-zone 120a-c. For example, the production zone 113 may include a fracture network or a plurality of smaller fracture networks, and the fracture network or one or more of the smaller fracture networks defined in one production sub-zone 120a-c may extend to abut or overlap with another smaller fracture network defined in an adjacent production sub-zone 120a-c.

The fractures created in the production zone 113 may be configured to allow the working fluid to slowly percolate therethrough and thereby gain thermal energy by contacting the walls of the various fractures. In some embodiments, the fracture network will have a higher conductivity near the production and injection wells 202a,b as compared with the middle of each production zone 120a-c. As a result, the fracture network facilitates enhanced injectivity and production near the wells 202a,b and avoids short circuiting in the middle portions. Those skilled in the art will appreciate that short circuiting is common in geothermal reservoirs because of thermal strain effects. As the rock cools due to contact with the fluid, it begins to contract and the fractures begin to open further. If there are any particularly conductive paths in the fracture network, these paths will accept more fluid, cool the rock at an increased rate, and potentially result in even wider fractures that accept more and more of the working fluid but result in less and less heat transfer. In other cases, the cool fluids may induce new fractures that increase the conductive paths in said fracture network. Whether or not the conductive flow path fracture networks are decreased, increased, or not altered may depend on formation conditions such as the mechanical properties of the rock, pore pressures, min/max stress orientation, thermal conductivity, induced pressures, etc.

As generally described above, one or more of the injection and production flow control devices 116, 118 may be selectively opened and/or closed in order to regulate the circulation of the working fluid through the production zone 113 and thereby ensure a steady and continuous production of heated working fluid from the corresponding production sub-zones 120a-c. In some embodiments, one or more of the injection and production flow control devices 116, 118 may be communicably coupled to and controlled by the computation device 122 arranged at the surface 106. In other embodiments, however, as briefly discussed above, the injection and production flow control devices 116, 118 may be configured to autonomously actuate in response to temperature or pressure gradients experienced downhole. As with prior embodiments, the injection and production flow control devices 116, 118 may be configured to actuate based upon a particular property of the working fluid including, but not limited to, the temperature, pressure, phase, or flow rate of the working fluid.

In the case where the particular property is the temperature of the working fluid, for example, the predetermined low temperature may be sensed at any of the production flow control devices 118, and the computation device 122 may be configured to trigger the closing or triggering actuation of the production flow control device 118 registering the low temperature such that heated working fluid production therefrom ceases or is otherwise slowed. While the particular production flow control device 118 is closed, its corresponding production sub-zone 120a-c may have the chance to thermally recover, at which point the production flow control device 118 may be reopened to re-commence heated working fluid production therefrom.

Accordingly, the geothermal well system 200 may provide intelligent control of the injection and production flow control devices 116, 118 such that a continuous and steady supply of heated working fluid is provided to the power plant 104 from the production zone 113. In some embodiments, the production flow control devices 118 may be configured to sequentially or strategically alternate such that production of the heated working fluid alternates between the various production sub-zones 120a-c, thereby ensuring that the temperature of the working fluid in each production sub-zone 120a-c remains above the predetermined low temperature limit. The injection flow control devices 116 may also be selectively actuated, thereby ensuring that an appropriate amount of working fluid is injected into each production sub-zone 120a-c such that a continuous and steady supply of heated working fluid is provided from the production zone 113. For example, closing or throttling the injection flow control device 116 corresponding to the first production zone 120a may result in the cessation or regulation of heated working fluid production via the corresponding production flow control device 118.

In one or more embodiments, the flow of the working fluid in the geothermal well system 200 may be reversed. For example, in at least one embodiment, the production string 114 may be used to inject the working fluid into the production zone 113, and the injection string 112 may be configured to draw heated working fluid from the production zone 113. Those skilled in the art will again readily appreciate that reversing the working fluid circulation may serve to remove or otherwise counteract the build-up of scale or solid particles in the system 200, which could develop over time and impede production to the surface 106.

Figure 3:
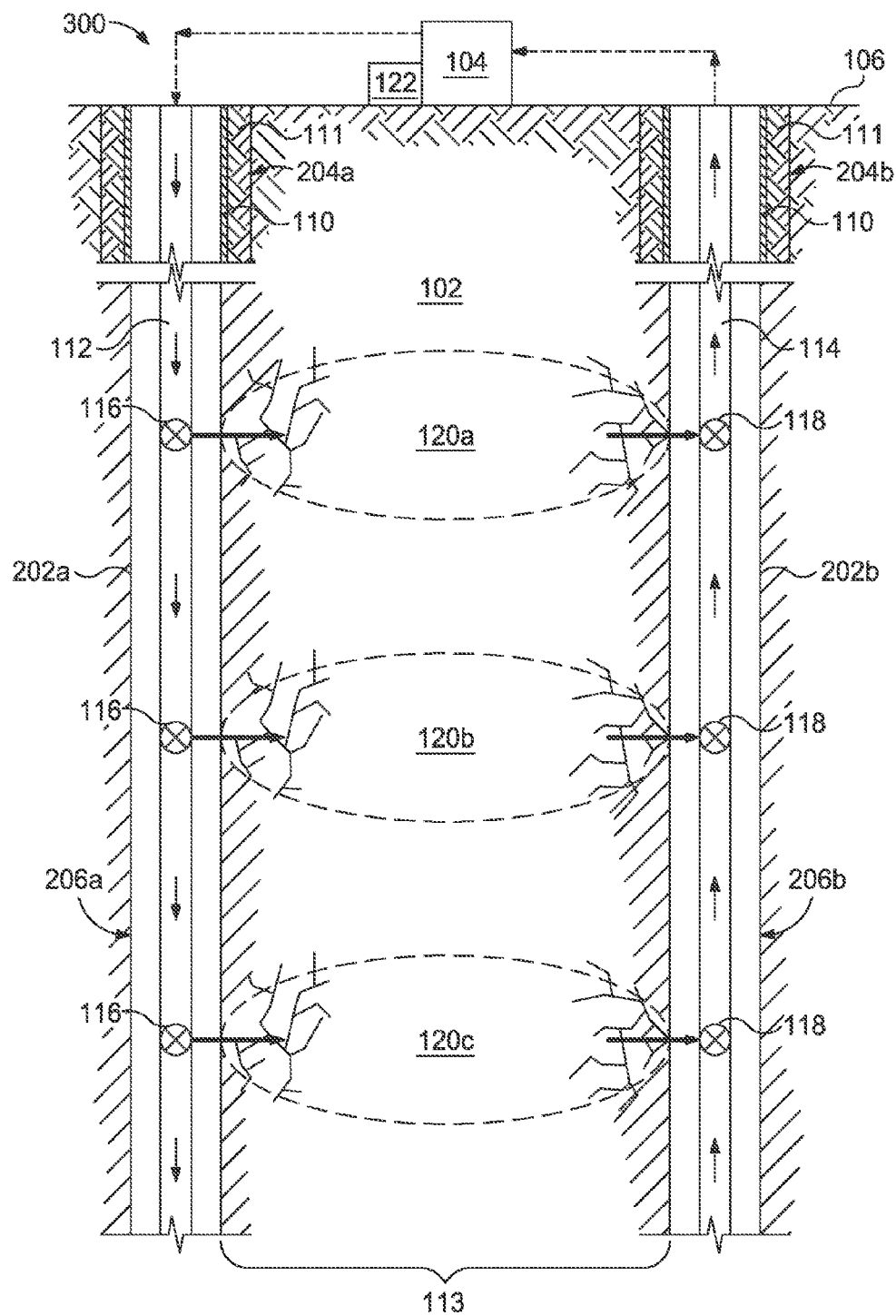
FIG. 3 illustrates another exemplary geothermal well system, according to one or more embodiments.

Referring now to FIG. 3, illustrated is another exemplary geothermal well system 300 used to extract heat from the subterranean formation 102, according to one or more embodiments. The geothermal well system 300 may be best understood with reference to FIGS. 1 and 2, where like numerals represent like components that will not be described again in detail. As illustrated, the well system 300 may include the injection well 202a having the injection string 112 generally arranged therein, and the production well 202b having the production string 114 generally arranged therein. Again, some of the upper or vertical sections 204a and 204b may include the casing string 110 cemented therein, but in some embodiments the casing string 110 may extend along the entire length of each well 202a,b and be appropriately perforated in order to allow the working fluid to circulate therethrough. Alternatively, or in other embodiments, the respective downhole ends of the injection and production strings 112, 114 may be perforated or otherwise include a perforated liner (not shown) that facilitates fluid communication into and/or out of each string 112, 114.

The production sub-zones 120a-c may again be defined in the production zone 113 of the subterranean formation 102 and correspond to related injection and production flow control devices 116, 118. While the production sub-zones 120a-c are shown as being vertically offset from each other within the production zone 113, it will be appreciated that the production sub-zones 120a-c may also be horizontally offset from each other within the production zone 113, without departing from the scope of the disclosure. Again, while only three production sub-zones 120a-c are illustrated, it will be appreciated that more than three may be provided or otherwise defined, without departing from the scope of the disclosure. Moreover, while shown as being vertically offset from each other in FIG. 3, one or more of the production sub-zones 120a-c may overlap or at least extend into close proximity with an adjacent production sub-zone 120a-c. For instance, the production zone 113 may include a fracture network or a plurality of smaller fracture networks, and the fracture network or one or more of the smaller fracture networks defined in, for example, the first production sub-zone 120a may extend to overlap with another smaller fracture network defined in the second production sub-zone 120b.

In operation, the injection and production flow control devices 116, 118 may again be selectively opened and/or closed in order to regulate the circulation of the working fluid through the production zone 113 and thereby ensure a steady and continuous production of heated working fluid from the corresponding production sub-zones 120a-c to the power plant 104. As described above, one or more of the injection and production flow control devices 116, 118 may be communicably coupled to and controlled by the computation device 122 arranged at the surface 106. Intelligently controlling the injection flow control devices 116 using the computation device 122 ensures that an appropriate amount of working fluid is injected into each production sub-zone 120a-c. Closing and/or throttling an injection flow control device 116 may result in the cessation or regulation of the heated working fluid produced from the corresponding production sub-zone 120a-c, thereby ensuring that the working fluid injected into the production sub-zones 120a-c is adequately heated before being produced to the surface 106. As with prior embodiments, the injection and production flow control devices 116, 118 may be configured to actuate based upon a particular property of the working fluid including, but not limited to, the temperature, pressure, phase, and/or flow rate of the working fluid.

Intelligently controlling the production flow control devices 118 using the computation device 122 ensures that heated working fluid having an appropriate temperature is continuously and steadily produced to the surface 106 via the production string 114. For example, when a particular production flow control device 118 senses that the temperature of the heated working fluid has reached the predetermined low temperature, the computation device 122 may be configured to trigger the closing or throttling actuation of the particular production flow control device 118. While the particular production flow control device 118 is closed, the corresponding production sub-zone 120a-c may be generally static and thereafter begin the process of thermally recovering. Once the particular production sub-zone 120a-c has thermally recovered, the corresponding production flow control device 118 may be reopened to re-commence heated working fluid production therefrom.

In other embodiments, however, as briefly discussed above, one or more of both the injection and production flow control devices 116, 118 may be configured to autonomously actuate (i.e., without the assistance of the computation device 122) in response to temperature and/or pressure gradients experienced downhole. Moreover, as with prior embodiments, the flow of the working fluid in the geothermal well system 300 may be reversed. For example, in at least one embodiment, the production string 114 may be used to inject the working fluid into the production zone 113, and the injection string 112 may be configured to draw heated working fluid from the production zone 113.

Figure 4:
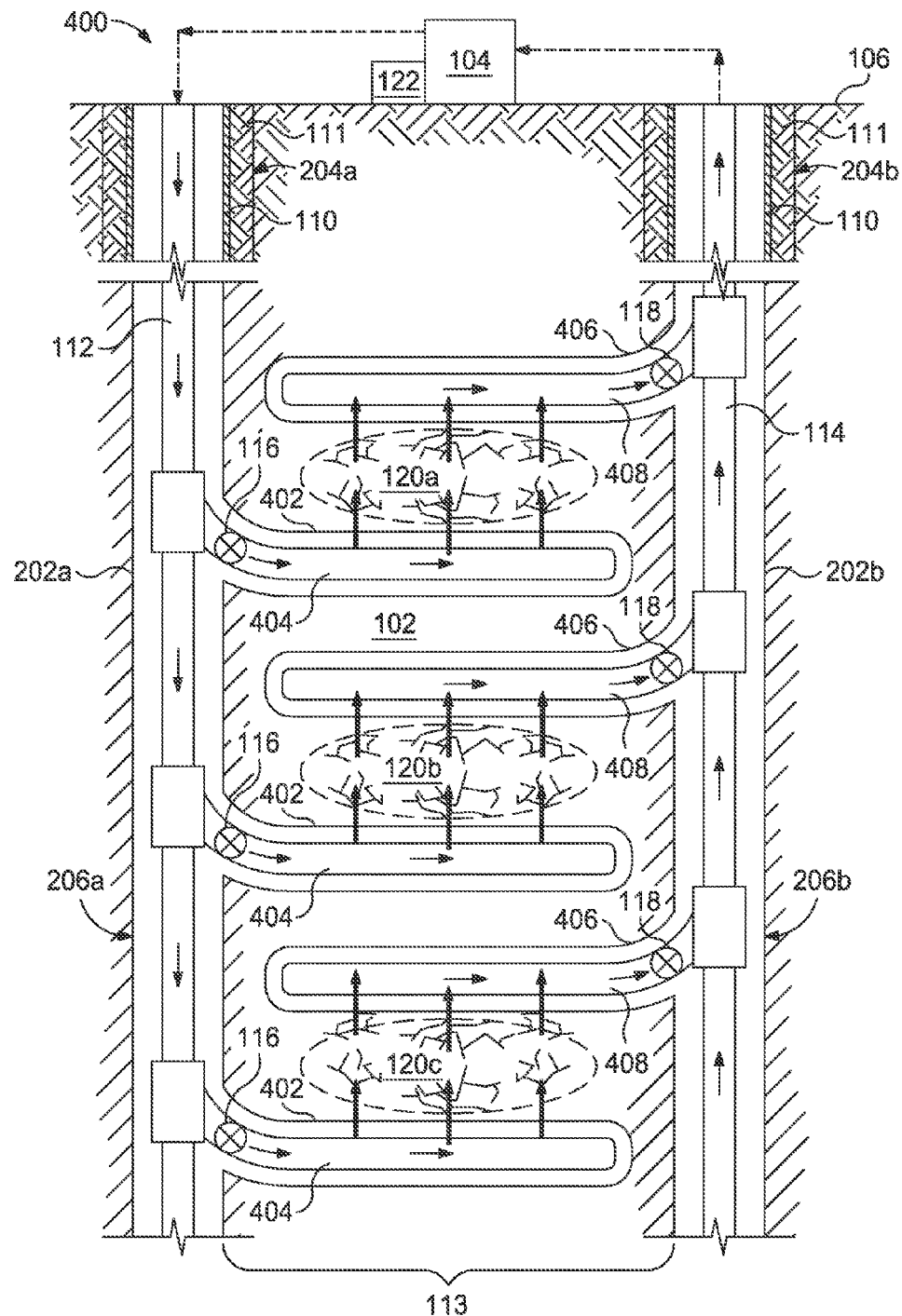
FIG. 4 illustrates another exemplary geothermal well system, according to one or more embodiments.

Referring now to FIG. 4, illustrated is another exemplary geothermal well system 400 used to extract heat from the subterranean formation 102, according to one or more embodiments. The geothermal well system 400 may be best understood with reference to FIGS. 1-3, where like numerals represent like components that will not be described again in detail. Similar to the geothermal well system 300 of FIG. 3, the geothermal well system 400 may include the injection well 202a having the injection string 112 generally arranged therein, and the production well 202b having the production string 114 generally arranged therein. Moreover, some of the upper or vertical sections 204a and 204b may include the casing string 110 cemented therein, but in some embodiments the casing string 110 may extend along the entire length of each well 202a,b and be appropriately perforated downhole such that fluid communication therethrough is possible.

As illustrated, in some embodiments, one or more lateral injection wells 402 may extend from the injection well 202a and into the production zone 113 defined in the subterranean formation 102. Each lateral injection well 402 may have a corresponding lateral injection string 404 generally arranged therein and extending from the primary injection string 112. Moreover, in some embodiments, one or more lateral production wells 406 may extend from the production well 202b and also into the production zone 113. Each lateral production well 406 may have a corresponding lateral production string 408 generally arranged therein and extending from the primary production string 114. The lateral injection and production wells 402, 406 may be drilled using any technology known to those skilled in the art. In some embodiments, for example, appropriate wellbore spacing may be achieved using passive and active ranging technologies which provide well control intervention services and wellbore collision avoidance. Appropriate wellbore spacing techniques will ensure that the horizontal and lateral wellbores are appropriately spaced from each other and correspondingly aligned so as to maximize production from the production zone 113. Suitable passive and active ranging technology may be obtained through, for example, VECTOR MAGNETICS™ of Ithaca, N.Y., now acquired by Halliburton's Sperry Drilling Services of Houston, Tex. Those skilled in the art, however, will readily recognize that many magnetic ranging and survey management technologies may be employed in order to keep the lateral wellbores a predefined distance from each other.

As illustrated, the lateral injection and production wells 402, 406 may be vertically offset from each other within the production zone 113. In other embodiments, however, the lateral injection and production wells 402, 406 may be horizontally or laterally offset from each other within the production zone 113, without departing from the scope of the disclosure. In yet other embodiments, the lateral injection and production wells 402, 406 may be both vertically and horizontally offset from each other within the production zone 113. Moreover, while only three lateral injection wells 402 and three lateral production wells 406 are illustrated, it will be appreciated that more (or less) than three lateral injection and/or production wells 402, 406 may be used in the system 400, without departing from the scope of the disclosure.

In at least one embodiment, the casing string 110 and cement 111 may extend to encase one or more of the lateral injection and production wells 402, 406. In such embodiments, the casing string 110 and cement 111 may be perforated so as to allow fluid communication in and/or out of the respective lateral injection and production strings 404, 408. Alternatively, or in other embodiments, the respective downhole ends of the lateral injection and production strings 404, 408 may be perforated or otherwise include a perforated liner (not shown) that facilitates fluid communication into and/or out of each lateral injection and production string 404, 408.

In some embodiments, one or more injection flow control devices 116 may be arranged within one or more of the lateral injection strings 404 (one injection flow control device 116 shown in each lateral injection string 404) and configured to intelligently regulate the flow of working fluid into the corresponding production sub-zones 120a-c. Likewise, one or more production flow control devices 118 may be arranged within one or more of the lateral production strings 408 (one production flow control device 118 shown in each lateral injection string 404) and configured to intelligently regulate the flow of heated working fluid out of the corresponding production sub-zones 120a-c. In operation, the injection and production flow control devices 116, 118 may be selectively opened and/or closed in order to regulate the circulation of the working fluid through the production zone 113 and thereby ensure a steady and continuous production of heated working fluid from the corresponding production sub-zones 120a-c to the power plant 104.

While only one injection flow control device 116 and only one production flow control device 118 are shown in each respective injection and production strings 404, 408, it will be appreciated that more than one injection and production flow control device 116, 118 may be arranged therein, without departing from the scope of the disclosure. For instance, as described in more detail below with reference to FIG. 5, having a plurality of injection and production flow control devices 116, 118 in each respective injection and production strings 404, 408 may result in the subdivision of each corresponding production sub-zone 120a-c. As a result, the heated working fluid within an individual production sub-zone 120a-c may be intelligently extracted with respect to the various subdivisions defined therein.

As described above, one or more of the injection and production flow control devices 116, 118 may be communicably coupled to and intelligently controlled by the computation device 122 arranged at the surface 106. Intelligently controlling the injection flow control devices 116 using the computation device 122 ensures that an appropriate amount of working fluid is injected into each production sub-zone 120a-c. Closing and/or throttling an injection flow control device 116 may result in the cessation or regulation of the heated working fluid produced from the corresponding production sub-zone 120a-c, thereby ensuring that the working fluid injected into the production sub-zones 120a-c is adequately heated before being produced to the surface 106.

As with prior embodiments, the injection and production flow control devices 116, 118 may again be configured to actuate based upon a particular property of the working fluid including, but not limited to, the temperature, pressure, phase, and/or flow rate of the working fluid.

Intelligently controlling the production flow control devices 118 using the computation device 122 ensures that heated working fluid having an appropriate temperature is continuously and steadily produced to the surface 106 via the production string 114. For example, when a particular production flow control device 118 senses that the temperature of the heated working fluid is at or declined past the predetermined low temperature, the computation device 122 may trigger the closing or throttling actuation of the particular production flow control device 118. While the particular production flow control device 118 is closed (or alternatively when a corresponding injection flow control device 116 is closed), the corresponding production sub-zone 120a-c may be generally static and therefore have the chance to thermally recover. Once the particular production sub-zone 120a-c has thermally recovered, the corresponding production flow control device 118 (or corresponding injection flow control device 116) may be reopened, as generally described above, to recommence heated working fluid production therefrom.

In other embodiments, however, the injection and production flow control devices 116, 118 may otherwise be configured to autonomously actuate (i.e., without the assistance of the computation device 122) in response to temperature and/or pressure gradients experienced downhole. Moreover, as with prior embodiments, the flow of the working fluid in the geothermal well system 400 may be reversed. For example, in at least one embodiment, the production string 114 may be used to inject the working fluid into the production zone 113, and the injection string 112 may be configured to draw heated working fluid from the production zone 113.

Figure 5:
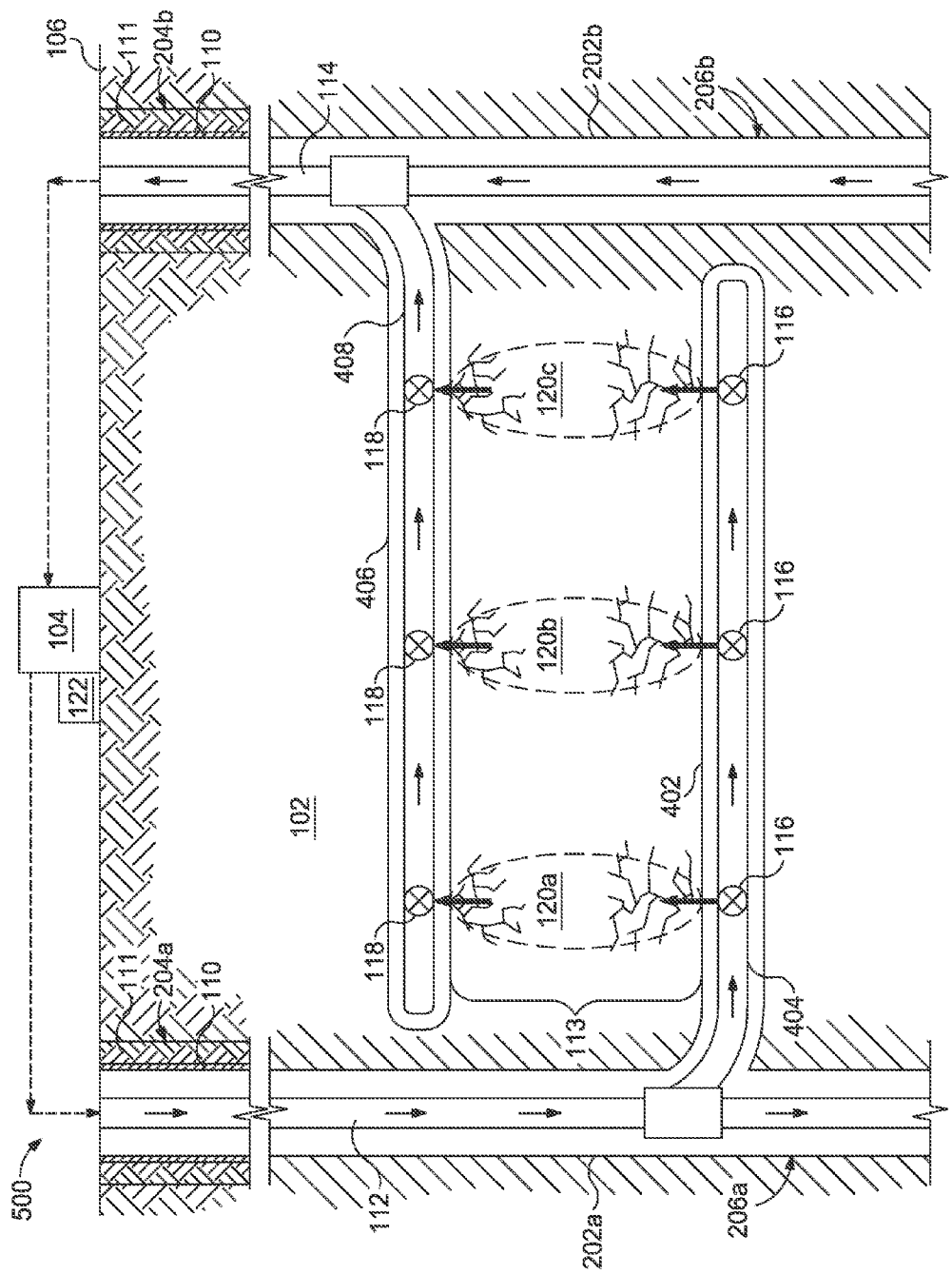
FIG. 5 illustrates another exemplary geothermal well system, according to one or more embodiments.

Referring now to FIG. 5, illustrated is another exemplary geothermal well system 500 used to extract heat from the subterranean formation 102, according to one or more embodiments. The geothermal well system 500 may be best understood with reference to FIGS. 1-5, where like numerals represent like components that will not be described again in detail. Similar to the geothermal well system 400 of FIG. 4, the geothermal well system 500 may include the injection well 202a having the injection string 112 generally arranged therein, and the production well 202b having the production string 114 generally arranged therein. Moreover, some of the upper or vertical sections 204a and 204b may include the casing string 110 cemented therein, but in some embodiments the casing string 110 may extend along the entire length of each well 202a,b.

Also similar to the geothermal well system 400 of FIG. 4, in some embodiments, the geothermal well system 500 may include one or more lateral injection wells 402 (one shown) that extend from the injection well 202a and into the production zone 113 defined in the subterranean formation 102. Each lateral injection well 402 may have a corresponding lateral injection string 404 generally arranged therein and extending from the injection string 112. Moreover, in some embodiments, one or more lateral production wells 406 (one shown) may extend from the production well 202b and also into the production zone 113. Each lateral production well 406 may have a corresponding lateral production string 408 generally arranged therein and extending from the production string 114.

In some embodiments, as illustrated, the lateral injection and production wells 402, 406 may be vertically offset from each other within the production zone 113. In other embodiments, however, the lateral injection and production wells 402, 406 may be horizontally or laterally offset from each other within the production zone 113, without departing from the scope of the disclosure. In yet other embodiments, the lateral injection and production wells 402, 406 may be both vertically and horizontally offset from each other within the production zone 113.

In at least one embodiment, the casing string 110 and the cement 111 may extend to encase one or each of the lateral injection and production wells 402, 406. In such embodiments, the casing string 110 and the cement 111 may be perforated downhole so as to allow fluid communication in and/or out of the respective lateral injection and production strings 404, 408. Alternatively, or in other embodiments, the respective downhole ends of the lateral injection and production strings 404, 408 may be perforated or otherwise include a perforated liner (not shown) that facilitates fluid communication into and/or out of each lateral injection and production string 404, 408.

The production sub-zones 120a-c may again be defined in the production zone 113 of the subterranean formation 102. In other embodiments, however, the illustrated production sub-zones 120a-c may be characterized as individual subdivisions of a single production sub-zone, as briefly discussed above. Again, while only three production sub-zones 120a-c are illustrated, it will be appreciated that more than three may be defined or otherwise provided, without departing from the scope of the disclosure. Moreover, while shown as being laterally offset from each other in FIG. 5, one or more of the production sub-zones 120a-c may overlap or at least extend into close proximity with an adjacent production sub-zone 120a-c. For instance, the production zone 113 may include a fracture network or a plurality of smaller fracture networks defined in, for example, the first production sub-zone 120a which may extend to abut or overlap with the fracture network or another plurality of smaller fracture networks defined in the second or adjacent production sub-zone 120b.

As illustrated, one or more injection flow control devices 116 may be arranged within the lateral injection string 404 and configured to intelligently regulate the flow of working fluid into the corresponding production sub-zones 120a-c. Likewise, one or more production flow control devices 118 may be arranged within one or more of the lateral production strings 408 and configured to intelligently regulate the flow of heated working fluid out of the corresponding production sub-zones 120a-c. In operation, the injection and production flow control devices 116, 118 may be selectively opened and/or closed in order to regulate the circulation of the working fluid through the production zone 113 and thereby ensure a steady and continuous production of heated working fluid from the corresponding production sub-zones 120a-c to the power plant 104. As with prior embodiments, the injection and production flow control devices 116, 118 may be configured to actuate based upon a particular property of the working fluid including, but not limited to, the temperature, pressure, phase, and/or flow rate of the working fluid.

As described above, one or more of the injection and production flow control devices 116, 118 may be communicably coupled to or otherwise intelligently controlled by the computation device 122 arranged at the surface 106. In operation, the computation device 122 may selectively actuate the injection flow control devices 116 (e.g., open, closed, or throttled) to ensure that an appropriate amount of working fluid is injected into each production sub-zone 120a-c. The computation device 122 may also selectively actuate the production flow control devices 118 (e.g., open, closed, or throttled) to ensure that heated working fluid having an appropriate temperature is continuously and steadily produced from the corresponding production sub-zone 120a-c and to the surface 106 via the production string 114. In other embodiments, however, the injection and production flow control devices 116, 118 may otherwise be configured to autonomously actuate (i.e., without the assistance of the computation device 122) in response to temperature and/or pressure gradients experienced downhole.

As with prior embodiments, the flow of the working fluid in the geothermal well system 500 may be reversed. For example, in at least one embodiment, the production string 114 and corresponding production flow control devices 118 may be used to inject the working fluid into the production zone 113, and the injection string 112 and corresponding injection flow control devices 116 may be configured to draw heated working fluid from the production zone 113.

Figure 6:
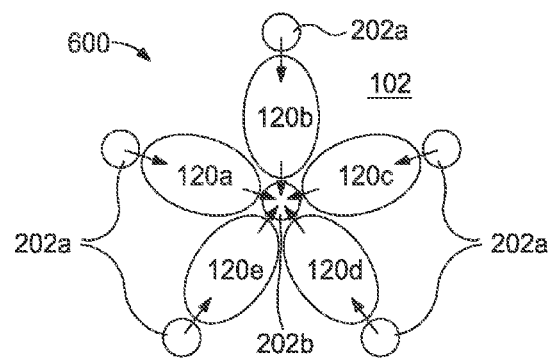
FIG. 6 illustrates a plan view of an array of wells pertaining to an exemplary geothermal well system, according to one or more embodiments.

Referring now to FIG. 6, illustrated is a plan view of an array of wells pertaining to an exemplary geothermal well system 600, according to one or more embodiments. The geothermal well system 600, and its various configurations, may be representative of several of the previously disclosed geothermal well systems 200-500, as generally described herein. As a result, the geothermal well system 600 may be best understood with reference to FIGS. 2-5, where like numerals indicate like elements not described again. In some embodiments, the geothermal well system 600 includes a production well 202b surrounded by an array of injection wells 202a. In other embodiments, however, the geothermal well system 600 may alternatively include an injection well 202a surrounded by an array of production wells 202b, without departing from the scope of the disclosure. Accordingly, the following discussion and embodiments may be equally applicable to both scenarios.

In some embodiments, each of the injection wells 202a may be substantially equidistantly spaced from one another about the production well 202b. In other embodiments, however, the injection wells 202a may be randomly spaced from one another about the production well 202b. In yet other embodiments, the injection wells 202a may be strategically spaced about the production well 202b from one another in order to best utilize or exploit the thermal properties of the subterranean formation 102. While FIG. 6 illustrates five injection wells 202a surrounding the production well 202b (or vice versa, depending on the scenario), it will be appreciated that more or less than five injection wells 202a may be arranged about the production well 202b. For example, an over-capacity of injection or production wells 202a,b may be preferred such that the power plant 104 is provided with more valving options than what is actually necessary to efficiently generate electricity, thereby having the potential to provide the power plant 104 with an overabundance of heated working fluid, if desired.

Moreover, while FIG. 6 is described as depicting a plan view of the geothermal well system 600, where the injection and production wells 202a,b are shown as vertically-disposed wells, FIG. 6 may equally and without limitation illustrate a cross-sectional side view of the geothermal well system 600, without departing from the scope of the disclosure. Indeed, FIG. 6 may alternatively illustrate a cross-sectional side view of the geothermal well system 600 where the injection and production wells 202a,b, or corresponding lateral injection and production wells 402, 406 (FIGS. 4 and 5), are horizontally-disposed within the subterranean formation 102.

As illustrated, each of the injection wells 202a may be configured to inject the working fluid into an adjacent production sub-zone 120, depicted as production sub-zones 120a, 120b, 120c, 120d, and 120e. As with prior embodiments, each production sub-zone 120a-e may be defined within a production zone 113 (FIGS. 2-5) of the subterranean formation 102. The production zone 113 may be fractured, thereby defining a fracture network or a plurality of smaller fracture networks configured to enhance fluid conductivity within the production zone 113. While shown as being offset from each other in FIG. 6, it will be appreciated that one or more of the production sub-zones 120a-e may overlap or at least extend into close proximity with an adjacent production sub-zone 120a-e.

As with prior disclosed systems, although not shown in FIG. 6, the injection and production wells 202a,b may likewise be equipped with one or more injection and production flow control devices 116, 118 communicably coupled to or otherwise controlled by the computation device 122. In operation, the computation device 122 may be configured to intelligently control each flow control device 116, 118 by selectively actuating the injection and/or production flow control devices 116, 118 (e.g., open, closed, or throttled) to ensure that an appropriate amount of working fluid is injected into each production sub-zone 120a-e and also that heated working fluid having an appropriate temperature is continuously and steadily produced to the surface 106. In other embodiments, however, the injection and production flow control devices 116, 118 may otherwise be configured to autonomously actuate (i.e., without the assistance of the computation device 122) in response to temperature and/or pressure gradients experienced downhole, and obtain substantially the same result.

For example, in one or more embodiments, the production flow control devices 118 may be configured to sequentially or strategically alternate such that production of the heated working fluid alternates between the various production sub-zones 120a-e, thereby ensuring that the temperature of the working fluid in each production sub-zones 120a-e remains above the predetermined low temperature limit, but more importantly ensuring that the power plant 104 receives a continuous supply of heated working fluid. In other embodiments, the first production sub-zone 120a may produce heated working fluid until the temperature declines to the predetermined low temperature, at which point the corresponding production and/or injection flow control device(s) 116, 118 may be closed or throttled and adjacent production and/or injection flow control device(s) 116, 118 may be opened in order to extract heat from an adjacent production sub-zone 120b-e. While production continues from one or more of the other production sub-zones 120b-e, the static first production sub-zone 120a may thermally recover and subsequently reopen production upon registering a temperature above the predetermined low temperature limit. In yet other embodiments, the injection and/or production flow control devices 116, 118 may selectively regulate the flow of heated working fluid into and/or out of each production sub-zone 120a-e such that the temperature of each production sub-zone 120a-e remains above the predetermined low temperature limit in perpetuity.

While the geothermal well systems 100-500 are generally described above as providing a continuous and steady flow of heated working fluid to the power plant 104, it should be noted that in some applications it may be desired to intelligently control the flow of heated working fluid such that the power plant 104 is provided with a non-continuous or otherwise non-steady flow of heated working fluid. In such cases, the power plant 104 may nonetheless be configured to strategically receive sufficient heated working fluid for its electricity output requirements, and thereby not depart from the scope of the disclosure.

Figure 7:
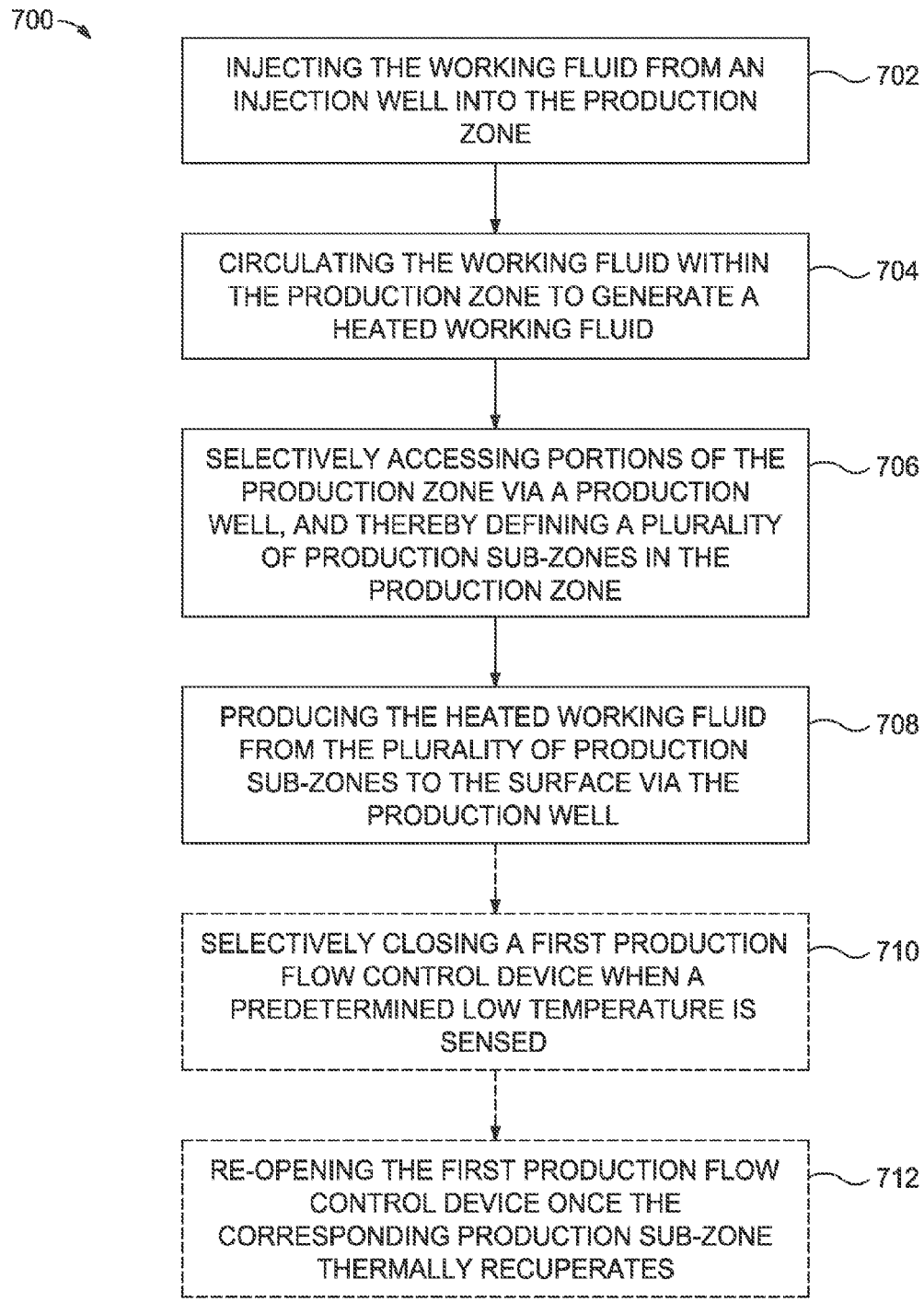
FIG. 7 is a flowchart of an exemplary method of extracting thermal energy from a subterranean formation.

Referring now to FIG. 7, with continued reference to FIGS. 1-6, illustrated is a flowchart of an exemplary method 700 of extracting thermal energy from the subterranean formation 102. The method 700 may include injecting the working fluid from an injection well 202a into the production zone 113, as at 702. The production zone 113 may be defined within the subterranean formation 102 and fractured to enhance fluid conductivity. In some embodiments, one or more injection flow control devices 116 may be arranged within an injection string 112 disposed within the injection well 202a and intelligently controlled with, for example, a computation device 122. The computation device 122 may be configured to trigger the actuation of the one or more injection flow control devices 116 in order to regulate the flow of the working fluid into the production zone 113. In other embodiments, the one or more injection flow control devices 116 may be intelligently controlled by injecting a diverting agent into the injection string 112 and plugging at least one of the one or more injection flow control devices 116 with the diverting agent.

Once in the production zone 113, the working fluid may then be circulated in order to generate a heated working fluid, as at 704. Portions of the production zone 113 may then be selectively accessed via a production well, thereby defining a plurality of production sub-zones in the production zone 113, as at 706. In some embodiments, selectively accessing the production zone further comprises selectively actuating one or more production flow control devices arranged within a production string disposed within the at least one production well and thereby providing access to the plurality of production sub-zones. In some aspects, the one or more production flow control devices may be selectively actuated based upon a property of the heated working fluid as extracted from a corresponding one of the plurality of production sub-zones. The property may include, but is not limited to, the temperature, pressure, phase, or flow rate of the heated working fluid.

In some embodiments, selectively actuating the one or more production flow control devices may include intelligently controlling the one or more production flow control devices with the computation device 122 communicably coupled thereto. In at least one embodiment, the computation device 122 may intelligently control the one or more production flow control devices based upon the sensed property of the heated working fluid. In other embodiments, however, the one or more production flow control devices are configured to autonomously operate without the assistance of the computation device 122.

The method 700 may further include producing the heated working fluid from the plurality of production sub-zones to the surface via the production well, as at 708. Accordingly, a corresponding supply of heated working fluid is intelligently produced to the surface and to an adjacent power plant which exploits the thermal energy in the heated working fluid and generates electricity therefrom.

In some embodiments, the method 700 may optionally include selectively closing a first production flow control device when a predetermined low temperature is sensed thereat, as at 710. The first production flow control device may be configured to extract heated working fluid from a corresponding first production sub-zone. While the first production flow control device is closed, the first production sub-zone may thermally recuperate to a temperature above the predetermined low temperature, at which point the method 700 may further optionally include re-opening the first production flow control device once the first production sub-zone thermally recuperates, as at 712. Once the first production flow control device is re-opened, production of the heated working fluid may be resumed from the first production sub-zone.

As will be appreciated, each of the injection and production flow control devices may be controlled such that the thermal energy from each production sub-zone may be strategically, sequentially, or otherwise intelligently harvested. By closing one or more of the injection and/or production flow control devices, the corresponding production sub-zone(s) may be provided with a chance to thermally recuperate at which point the one or more of the injection and/or production flow control devices may again be opened in order to once more harvest thermal energy from the corresponding production sub-zone(s).

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A geothermal well system, comprising:
at least one injection well extending from a surface to a subterranean formation and being configured to inject a working fluid into a production zone defined within the subterranean formation and thereby generate a heated working fluid, wherein the production zone has been fractured to enhance fluid conductivity;

at least one production well extending from the surface to the subterranean formation; and one or more production flow control devices arranged downhole within the production well to provide access to the production zone and thereby defining a plurality of production sub-zones within the production zone, wherein at least one production flow control device is arranged at each production sub-zone in order to selectively access each production sub-zone in order to extract heated working fluid therefrom and thereby provide a corresponding supply of heated working fluid to the surface, and wherein the one or more production flow control devices comprise one or more sensors to determine a property of the heated working fluid as extracted from a corresponding one of the plurality of production sub-zones, and the one or more production flow control devices are selectively actuatable based upon the determined property falling below a predetermined threshold.

2. The system of claim 1, wherein the at least one injection well comprises an injection string and the at least one production well comprises a production string, the injection and production strings being arranged within a common wellbore.

3. The system of claim 2, wherein the injection string and the production string are united as a combined injection/production string.

4. The system of claim 1, further comprising a production string arranged within the at least one production well, wherein the one or more production flow control devices are arranged within the production string and are selectively actuatable to provide access to the plurality of production sub-zones.

5. The system of claim 1, wherein the property is one of a temperature, a phase, a pressure, or a flow rate of the heated working fluid.

6. The system of claim 1, further comprising a computation device communicably coupled to the one or more production flow control devices, the computation device being configured to intelligently control the one or more production flow control devices in order to selectively access the plurality of production sub-zones and thereby extract heated working fluid therefrom.

7. The system of claim 6, wherein the computation device intelligently controls the one or more production flow control devices based upon a temperature of the heated working fluid as extracted from a corresponding one of the plurality of production sub-zones.

8. The system of claim 6, further comprising an injection string arranged within the at least one injection well and having one or more injection flow control devices arranged downhole within the injection string, the one or more injection flow control devices being communicably coupled to the computation device which regulates a flow of the working fluid into the one or more production zones via the one or more injection flow control devices.

9. The system of claim 1, further comprising:

one or more lateral production wells extending from the at least one production well and into the production zone, wherein the one or more production flow control devices are arranged downhole in each lateral production well and are selectively actuatable to provide access to the plurality of production sub-zones.

10. The system of claim 9, wherein the one or more production flow control devices are selectively actuated based upon a property of the heated working fluid as extracted from a corresponding one of the plurality of production sub-zones.

11. The system of claim 10, wherein the property is one of a temperature, a phase, a pressure, or a flow rate of the heated working fluid.

12. The system of claim 9, further comprising a computation device communicably coupled to the one or more production flow control devices, the computation device being configured to intelligently control the one or more production flow control devices in order to selectively access the plurality of production sub-zones and thereby extract heated working fluid therefrom.

13. The system of claim 12, further comprising one or more lateral injection wells extending from the at least one injection well and into the production zone.

14. The system of claim 13, further comprising one or more injection flow control devices arranged downhole in each lateral injection well and being communicably coupled to the computation device, the computation device being configured to selectively actuate the one or more injection flow control devices in order to regulate the injection of working fluid into the plurality of production sub-zones.

15. The system of claim 13, wherein the plurality of production sub-zones are defined between the one or more lateral production wells and the one or more lateral injection wells.

16. The system of claim 1, wherein the working fluid is at least one of water, an emulsion, and a gas.

17. The system of claim 1, further comprising an injection string arranged within the at least one injection well and having one or more injection flow control devices arranged downhole within the injection string, the one or more injection flow control devices being selectively actuatable in order to regulate a flow of the working fluid into the plurality of production sub-zones.

18. A method of extracting thermal energy from a subterranean formation, comprising:

injecting a working fluid from at least one injection well into a production zone defined in a subterranean formation, the at least one injection well extending from a surface and the production zone being fractured to enhance fluid conductivity;

circulating the working fluid within the production zone in order to generate a heated working fluid;

selectively accessing the production zone via at least one production well extending from the surface, the at least one production well having one or more production flow control devices arranged therein downhole and thereby defining a plurality of production sub-zones in the production zone, wherein each production flow control device is arranged at each production sub-zone;

determining a property of the heated working fluid as extracted from a corresponding one of the plurality of production sub-zones using one or more sensors of the one or more production flow control devices, and selectively actuating the one or more production flow control devices based upon the determined property falling below a predetermined threshold; and producing the heated working fluid from the plurality of production sub-zones to the surface via the at least one production well and thereby providing a corresponding supply of heated working fluid to the surface.

19. The method of claim 18, wherein selectively accessing the production zone further comprises selectively actuating the one or more production flow control devices, wherein the one or more production flow control devices are arranged within a production string disposed within the at least one production well.

20. The method of claim 18, wherein the property is a predetermined low temperature of the heated working fluid, the method further comprising:
 closing a first production flow control device when the predetermined low temperature is sensed at the first production flow control device, the first production flow control device being configured to extract heated working fluid from a corresponding first production sub-zone;
 allowing the corresponding first production sub-zone to thermally recuperate to a temperature above the predetermined low temperature; and
 re-opening the first production flow control device to resume production of the heated working fluid from the first production sub-zone.

21. The method of claim 19, wherein selectively actuating the one or more production flow control devices further comprises intelligently controlling the one or more production flow control devices with a computation device communicably coupled thereto.

22. The method of claim 21, further comprising intelligently controlling the one or more production flow control devices based upon a property of the heated working fluid as extracted from a corresponding one of the plurality of production sub-zones.

23. The method of claim 21, further comprising intelligently controlling one or more injection flow control devices with the computation device, the one or more injection flow control devices being arranged within an injection string disposed within the at least one injection well.

24. The method of claim 23, wherein intelligently controlling the one or more injection flow control devices further comprises regulating a flow of the working fluid into the plurality of production sub-zones.

25. The method of claim 19, wherein the at least one production well includes one or more lateral production wells extending therefrom and into the production zone, the one or more production flow control devices being arranged in the one or more lateral production wells in order to provide access to the plurality of production sub-zones.

26. The method of claim 18, further comprising:
 selectively actuating one or more injection flow control devices arranged within an injection string disposed within the at least one injection well; and
 regulating a flow of the working fluid into the plurality of production sub-zones.

27. A geothermal well system, comprising:
 at least one injection well extending from a surface and through a subterranean formation, the at least one injection well being configured to inject a fluid into a production zone defined within the subterranean formation and thereby generate a heated working fluid, the production zone being fractured to enhance fluid conductivity;
 at least one production well extending from the surface and to the subterranean formation, the at least one production well being configured to produce the heated working fluid from the production zone to the surface;
 one or more lateral production wells extending from the at least one production well and into the production zone; and
 one or more production flow control devices arranged downhole within in each lateral production well and being selectively actuatable to provide access to the production zone and thereby define a plurality of production sub-zones within the production zone,
 the plurality of production sub-zones being configured to provide fluid communication between the at least one injection well and the at least one production well and thereby provide a corresponding supply of heated working fluid to the surface and
 the one or more production flow control devices comprising one or more sensors to determine a property of the heated working fluid as extracted from a corresponding one of the plurality of production sub-zones, and the one or more production flow control devices being selectively actuatable based upon the determined property falling below a predetermined threshold.

28. The system of claim 27, wherein the property is one of a temperature, a phase, a pressure, or a flow rate of the heated working fluid.

29. The system of claim 27, further comprising a computation device communicably coupled to the one or more production flow control devices and being configured to intelligently control the one or more production flow control devices in order to selectively access the plurality of production sub-zones and thereby extract heated working fluid therefrom.

30. The system of claim 29, further comprising one or more lateral injection wells extending from the at least one injection well and into the production zone.

31. The system of claim 30, further comprising one or more injection flow control devices arranged downhole in each lateral injection well and communicably coupled to the computation device, the computation device being configured to selectively actuate the one or more injection flow control devices in order to regulate the injection of working fluid into the plurality of production sub-zones.

32. The system of claim 30, wherein the plurality of production sub-zones are defined between the one or more lateral production wells and the one or more lateral injection wells.

33. The system of claim 27, wherein the working fluid is one of water, an emulsion, or a gas.

* * * * *

UNITED STATES PATENT AND TRADEMARK OFFICE
CERTIFICATE OF CORRECTION

PATENT NO. : 9,726,157 B2
APPLICATION NO. : 13/882600
DATED : August 8, 2017
INVENTOR(S) : Ronald E. Sweatman et al.

It is certified that error appears in the above-identified patent and that said Letters Patent is hereby corrected as shown below:

In the Claims

In Column 28, Line 12:
Replace "within in each", with --within each--.

In Column 28, Line 20:
Replace "surface and", with --surface, and--.

Signed and Sealed this
Twenty-sixth Day of September, 2017

Joseph Matal
*Performing the Functions and Duties of the
Under Secretary of Commerce for Intellectual Property and
Director of the United States Patent and Trademark Office*